US009988137B2

(12) United States Patent
Borumand

(10) Patent No.: US 9,988,137 B2
(45) Date of Patent: Jun. 5, 2018

(54) METHODS AND APPARATUS FOR FORMING AND INSTALLING INSULATION BLANKETS IN A VEHICLE COMPARTMENT

(71) Applicant: The Boeing Company, Chicago, IL (US)

(72) Inventor: Khashayar Borumand, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 15/084,231

(22) Filed: Mar. 29, 2016

(65) Prior Publication Data

US 2017/0283031 A1  Oct. 5, 2017

(51) Int. Cl.
*B64C 1/40* (2006.01)
*B60R 13/08* (2006.01)
*A62C 3/08* (2006.01)

(52) U.S. Cl.
CPC ............ *B64C 1/403* (2013.01); *A62C 3/08* (2013.01); *B60R 13/08* (2013.01); *B64C 1/40* (2013.01);
(Continued)

(58) Field of Classification Search
CPC ... B64C 1/40; B64C 1/403; B64D 2033/0206; B60R 13/08; B60R 2013/0807; E04B 1/7629; E04B 1/7654; E04B 1/7658; E04B 1/7662; E04B 1/7666; E04B 1/767; E04B 2001/8263; E04B 2001/8281; E04B 2001/829; E04D 13/1625; E04D 13/1631; A44C 5/0053
See application file for complete search history.

(56) References Cited

U.S. PATENT DOCUMENTS

| 2,955,339 | A | * | 10/1960 | Richardson | ............ | A01G 13/02 24/703.1 |
| 4,075,806 | A | * | 2/1978 | Alderman | ............ | E04D 3/3602 52/478 |

(Continued)

FOREIGN PATENT DOCUMENTS

| DE | 2634596 A1 | * | 2/1978 | ........... B60R 13/043 |
| DE | 3510945 A1 | * | 10/1985 | ........... E04B 1/7629 |

(Continued)

OTHER PUBLICATIONS

European Patent Office, Extended European Search Report, issued in connection with European Patent Application No. 17160037.2, dated Aug. 14, 2017, 10 pages.

*Primary Examiner* — Joseph W Sanderson
(74) *Attorney, Agent, or Firm* — Hanley, Flight & Zimmerman, LLC

(57) ABSTRACT

Methods and apparatus for forming and installing insulation blankets in a vehicle compartment are disclosed. An example apparatus includes an insulation blanket that includes an outer layer, an insulation layer disposed in the outer layer, and a first fastener disposed in the insulation layer. The outer layer and the insulation layer are to form to a first channel. The first fastener is to receive, via the first channel, a first portion of a vehicle compartment frame to sealingly couple the insulation layer and the outer layer of the insulation blanket to the vehicle compartment frame.

20 Claims, 8 Drawing Sheets

(52) U.S. Cl.
CPC ...... *B64C 1/406* (2013.01); *B60R 2013/0807* (2013.01)

(56) References Cited

U.S. PATENT DOCUMENTS

| | | | | |
|---|---|---|---|---|
| 4,520,594 A * | 6/1985 | Adell | ...................... | B32B 15/08 |
| | | | | 49/462 |
| 5,577,688 A * | 11/1996 | Sloan | ...................... | B64C 1/067 |
| | | | | 244/117 R |
| 5,680,680 A | 10/1997 | LaConte | | |
| 5,697,139 A * | 12/1997 | Gaetke | .................... | B65D 35/18 |
| | | | | 222/92 |
| 5,724,780 A * | 3/1998 | Bolich | ...................... | E04D 13/1625 |
| | | | | 52/407.1 |
| 5,779,193 A * | 7/1998 | Sloan | ...................... | B64C 1/067 |
| | | | | 244/117 R |
| 6,579,586 B1 * | 6/2003 | Fay | ...................... | E04L 31/767 |
| | | | | 428/192 |
| 6,886,783 B2 | 5/2005 | Guard et al. | | |
| 7,367,527 B2 * | 5/2008 | Shumate | .................... | B64C 1/40 |
| | | | | 244/129.1 |
| 7,374,132 B2 * | 5/2008 | Shumate | .................... | B64C 1/40 |
| | | | | 244/129.1 |
| 7,946,525 B2 * | 5/2011 | Groning | .................. | B64C 1/403 |
| | | | | 181/294 |
| 8,162,104 B2 * | 4/2012 | Bastion | .................... | E04B 1/86 |
| | | | | 181/284 |
| 8,205,309 B2 * | 6/2012 | Pham | ...................... | B60R 11/00 |
| | | | | 24/487 |
| 8,616,498 B2 | 12/2013 | Hossain et al. | | |
| 8,662,448 B2 | 3/2014 | Weston et al. | | |
| 8,899,519 B2 * | 12/2014 | Smith | ...................... | B64C 1/40 |
| | | | | 244/117 R |
| 9,309,905 B2 * | 4/2016 | Lacroix | ............... | B60R 13/0876 |
| 9,352,821 B2 * | 5/2016 | Wilander | ................ | B64C 1/403 |
| 9,382,929 B2 * | 7/2016 | Carrillo | .................... | F16B 2/24 |
| 2004/0221972 A1 * | 11/2004 | Tomlinson | ............ | E04B 1/8409 |
| | | | | 160/327 |
| 2005/0183368 A1 * | 8/2005 | Morrill | ................ | E04D 13/1625 |
| | | | | 52/506.01 |
| 2006/0284014 A1 * | 12/2006 | Muller | ...................... | A62C 2/06 |
| | | | | 244/119 |
| 2007/0045469 A1 * | 3/2007 | Shumate | .................... | B64C 1/40 |
| | | | | 244/129.1 |
| 2007/0090267 A1 * | 4/2007 | Sillik | .................... | E04L 31/7666 |
| | | | | 248/510 |
| 2008/0000181 A1 * | 1/2008 | Sillik | .................... | E04L 31/7654 |
| | | | | 52/404.3 |
| 2009/0090812 A1 * | 4/2009 | Boock | ...................... | B64C 1/40 |
| | | | | 244/1 N |
| 2009/0302154 A1 | 12/2009 | Gröning | | |
| 2010/0031598 A1 * | 2/2010 | Moore | ...................... | E04D 13/1612 |
| | | | | 52/506.08 |
| 2010/0139055 A1 * | 6/2010 | Pham | ...................... | B60R 11/00 |
| | | | | 24/458 |
| 2010/0320323 A1 * | 12/2010 | Mueller | .................... | B64C 1/40 |
| | | | | 244/129.1 |
| 2011/0226546 A1 * | 9/2011 | Bastion | .................... | E04B 1/86 |
| | | | | 181/284 |
| 2012/0210665 A1 * | 8/2012 | Park | ...................... | B28B 7/0064 |
| | | | | 52/506.05 |
| 2012/0234979 A1 | 9/2012 | Smith | | |
| 2012/0305706 A1 * | 12/2012 | Weston | ...................... | B64C 1/40 |
| | | | | 244/119 |
| 2013/0097838 A1 * | 4/2013 | Lacroix | ............... | B60R 13/0876 |
| | | | | 29/426.6 |
| 2013/0299630 A1 * | 11/2013 | Redecker | ................ | B64C 1/067 |
| | | | | 244/1 N |
| 2014/0189986 A1 * | 7/2014 | Carrillo | .................... | F16B 2/24 |
| | | | | 24/564 |
| 2015/0225070 A1 * | 8/2015 | Wilander | ................ | B64C 1/403 |
| | | | | 244/131 |

FOREIGN PATENT DOCUMENTS

| | | | | |
|---|---|---|---|---|
| WO | WO-1982/001024 A * | 4/1982 | .......... | E04B 1/7629 |
| WO | 2005068290 | 7/2005 | | |

* cited by examiner

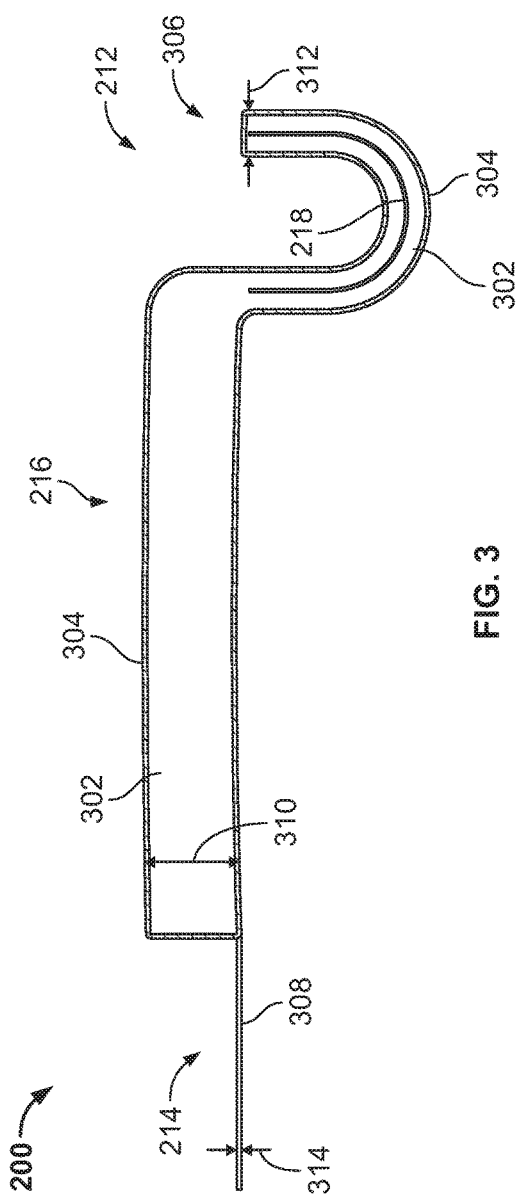
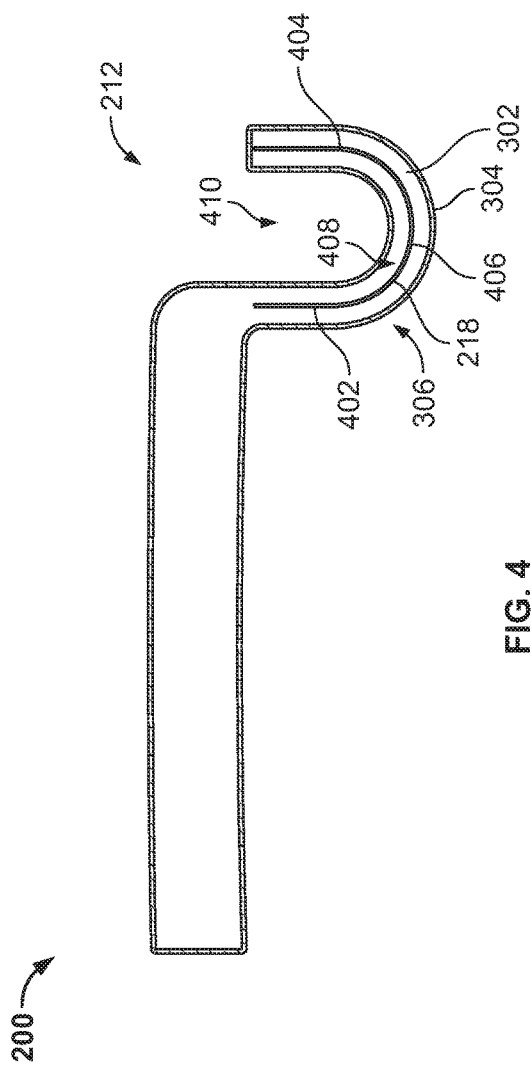

METHODS AND APPARATUS FOR FORMING AND INSTALLING INSULATION BLANKETS IN A VEHICLE COMPARTMENT

FIELD OF THE DISCLOSURE

This patent relates generally to insulation blankets and, more particularly, to methods and apparatus for forming and installing insulation blankets in a vehicle compartment.

BACKGROUND

Aircraft often include compartments (e.g., a cargo compartment, a passenger compartment, a flight deck, etc.) disposed in a fuselage of the aircraft. Some known aircraft line the fuselage and/or the compartments with insulation to improve the safety and/or comfort within the compartments. For example, the aircraft may be lined with insulation to control thermal, moisture, air pressure and/or noise characteristics within the compartments of the aircraft. In some instances, the insulation lining the aircraft includes insulation blankets coupled to ribs of a frame that extend along the fuselage of the aircraft.

SUMMARY

In one example, an apparatus includes an insulation blanket that includes an outer layer, an insulation layer disposed in the outer layer, and a first fastener disposed in the insulation layer. The outer layer and the insulation layer are to form to a first channel. The first fastener is to receive, via the first channel, a first portion of a vehicle compartment frame to sealingly couple the insulation layer and the outer layer of the insulation blanket to the vehicle compartment frame.

In another example, an apparatus includes a unitary fastener contained in a flexible insulation blanket to sealingly couple the insulation blanket to an aircraft compartment frame. The fastener includes a first leg, a second leg opposite the first leg, and a middle portion extending between the first leg and the second leg. The first leg, the second leg, and the middle portion of the fastener define a channel that is to receive the aircraft compartment frame. The first leg and the second leg are to engage the aircraft compartment frame to sealingly couple the insulation blanket to the aircraft compartment frame.

In another example, a method includes disposing fasteners in an insulation layer of an insulation blanket along a first side of the insulation blanket. The fasteners are spaced apart from each other along the first side. The method includes enclosing the fasteners and the insulation layer in an outer layer to form the insulation blanket and forming the insulation layer and the outer layer to a channel defined by the fasteners extending along the first side of the insulation blanket. The channel is to receive a first portion of a vehicle compartment frame to sealingly couple the insulation blanket to the vehicle compartment frame.

BRIEF DESCRIPTION OF THE DRAWINGS

FIG. 3 is a cross-sectional view of the insulation blanket of FIGS. 2A and 2B.

FIG. 4 is a partial cross-sectional view of a first side of the insulation blanket of FIGS. 2A and 2B.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
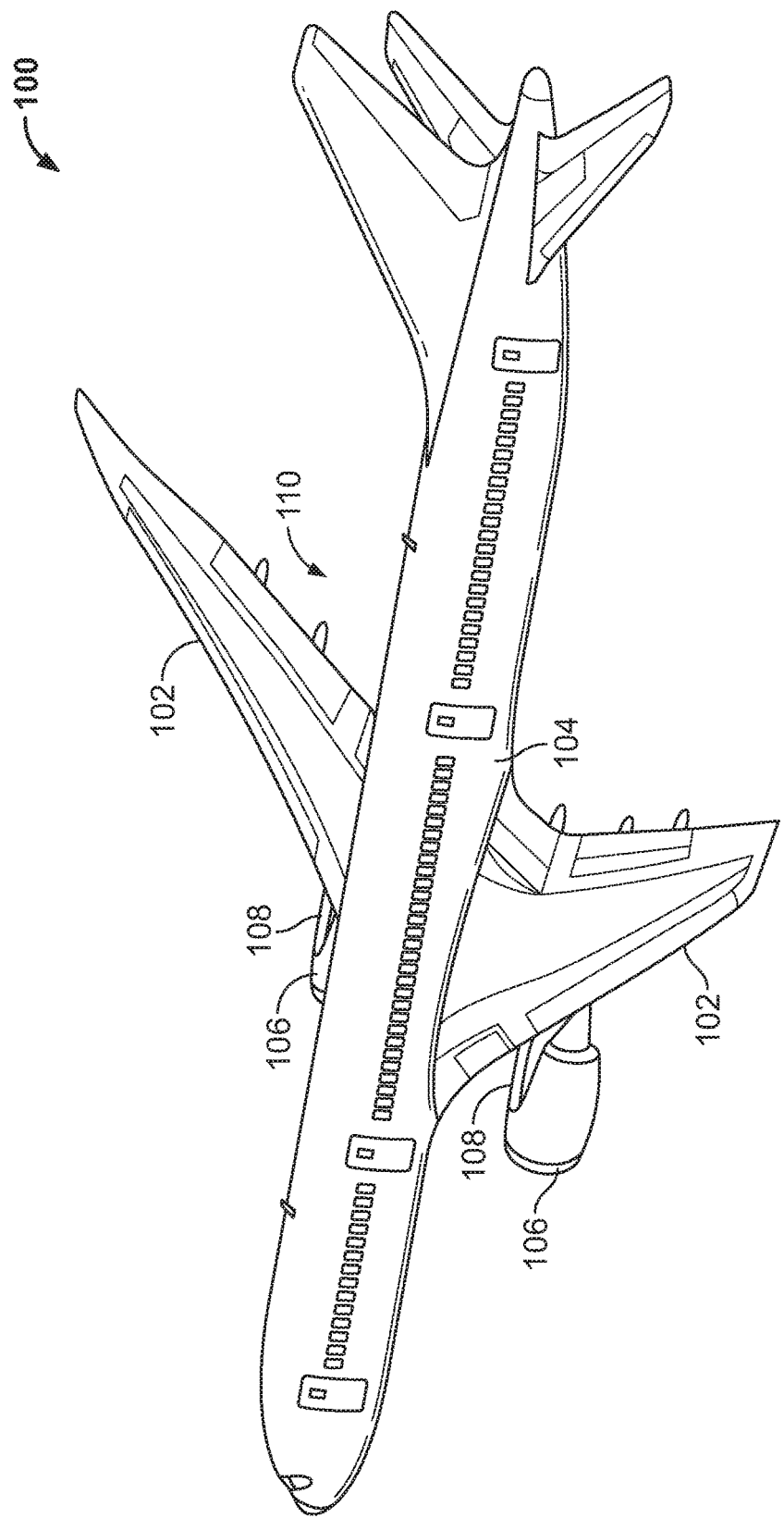
FIG. 1 depicts an example aircraft in accordance with the teachings herein.

Many known vehicles include compartments (e.g., cargo compartments, passenger compartments, flight decks, etc.) to contain items (e.g., cargo, equipment, etc.) and/or people, (e.g., passengers, crew members, etc.) during travel. For example, a cargo compartment, a passenger compartment and/or a flight deck are typically disposed in a fuselage of aircraft. To increase the safety and/or comfort of the environment in the vehicle compartments, some known aircraft line the fuselage and/or the compartments with insulation. In some examples, the compartments of known aircraft are lined with insulation so that passengers, crew members, electrical components, other airline systems, etc. are not exposed to temperatures, air pressures and/or noise levels of other compartments or surfaces of the aircraft. For example, the insulation of some known aircraft deters moisture and/or condensation from forming in the compartment that would otherwise result from a quick change in temperature in the compartment.

To insulate a compartment, some known aircraft include insulation blankets that are positioned side-by-side and/or end-to-end along an outer portion (e.g., an outer frame) of the compartment. That is, the insulation blankets are positioned next to each other (e.g., side-by-side, end-to-end, staggered, etc.) along the outer frame of the compartment to patch together an insulation surface at the outer portion of the compartment. In some instances, gaps form between adjacent insulation blankets and/or between one or more of the insulation blankets and the outer frame of the compartment. Such gaps create fluid passageways in fluid communication with the aircraft compartment that enable air to travel between the vehicle compartment and the surrounding environment external to the aircraft.

As a result, the insulation provided by the insulation blankets is reduced and/or impaired. For example, the air traversing through the fluid passageways may expose the passengers, crew members, cargo, and/or flight equipment located in the aircraft compartment to undesirable temperatures, pressures, etc. Additionally or alternatively, if the temperature in the aircraft compartment and the temperature of the external environment are substantially different (e.g., the surrounding external environment is significantly colder than the temperature in the aircraft compartment), condensation and/or moisture may form within the aircraft compartment. Further, the fluid passageways between the insulation blankets and/or the outer frame may result in uncomfortable and/or otherwise undesirable air pressure and/or noise levels in the aircraft compartment.

Example insulation blankets disclosed herein include a fastener disposed in an insulation layer of the insulation blanket that is to couple the insulation blanket to a frame of a vehicle compartment (e.g., an aircraft compartment). Because the fastener of the example insulation blanket is disposed in the insulation blanket, only a fraction of a thickness of the insulation blanket (e.g., about half the thickness of the insulation blanket) is positioned between the fastener and the frame when the fastener clamps the insulation blanket to the frame. As a result, a clamping pressure acting on that portion of the insulation blanket is increased, thereby enabling the fastener to increase a seal formed between the insulation blanket and the frame. Further, the insulation layer in which the fastener is disposed provides thermal and/or moisture insulation to the fastener, thereby preventing condensation from forming on the fastener and, thus, in the aircraft compartment. In some examples, the fasteners are composed of a lightweight thermoplastic material to reduce an amount of weight that the fastener adds to an aircraft. Additionally or alternatively, because the fastener is disposed in the insulation blanket, the insulation blanket may be coupled to the frame of the aircraft compartment without use of additional external components (e.g., external fasteners). As a result, the time required to install the insulation blanket and/or the risk of foreign object debris (FOD) such as misplaced fasteners unintentionally left in the aircraft compartment is significantly reduced.

The example apparatus disclosed herein include an insulation blanket that has an outer layer, an insulation layer disposed in the outer layer, and a fastener (e.g., a first fastener) disposed in the insulation layer. The fastener is to receive, via a channel (e.g., a first channel) formed by the outer layer and the insulation layer, a portion (e.g., a first portion) of a vehicle compartment frame to sealingly couple the insulation layer and the outer layer of the insulation blanket to the vehicle compartment frame. For example, the vehicle compartment frame may be an aircraft compartment frame disposed in a nacelle of an aircraft. In such examples, the insulation blanket insulates an aircraft compartment to deter fluid from flowing to the interior aircraft compartment from outer structures of the aircraft.

In some examples, the outer layer and the insulation layer are composed of flexible materials that enable adjacent portions of the outer layer and the insulation layer (e.g., first and second portions, respectively) to be positioned along an inner surface of the fastener to enable the fastener to couple the insulation blanket to the compartment frame. In other examples, the outer layer is composed of a semi-rigid material positioned along an inner surface of the fastener that enables the outer layer to form a seal with a surface of the compartment frame when fastener couples the insulation blanket to the compartment frame. Additionally or alternatively, the outer layer is composed of a fire-resistant material to provide flame-penetration resistance to the insulation layer and the fastener.

In some examples, the insulation blanket includes a bay blanket and a cap strip that extends along and which is coupled to and/or protrudes from a first side of the bay blanket. The cap strip and the bay blanket are formed by the insulation layer and the outer layer, and the cap strip contains the fastener of the insulation blanket. In such examples, the cap strip seals the insulation blanket and the compartment frame via the fastener disposed in the cap strip.

The fastener of the example apparatus is disposed in the insulation blanket to prevent the fastener from separating from the insulation blanket. To further prevent separation between the fastener and the insulation blanket, the fastener may be fixedly coupled to the insulation blanket. Additionally or alternatively, the fastener is disposed in the insulation layer of the insulation blanket to increase a sealing engagement between the insulation blanket and the compartment frame, for example, to increase thermal insulation, decrease moisture accumulation, increase acoustic insulation, etc. Further, the insulation layer insulates the fastener to prevent condensation from forming on the fastener and, thus, to prevent condensation from forming in the compartment.

The fastener of the example apparatus disclosed herein is a unitary structure that includes a first leg, a second leg opposite the first leg, and a middle portion extending between the first leg and the second leg. The first leg and the second leg are to engage the compartment frame to sealingly couple the insulation blanket to the compartment frame. For example, the first leg and the second leg clamp a portion of the insulation blanket to the compartment frame to form a seal between the insulation blanket and the compartment frame. To clamp the insulation blanket to the compartment frame, the first leg and the second leg initially flex away from each other to enable the fastener to receive the compartment frame and, upon receiving the compartment frame, the first leg and the second leg subsequently flex toward each other to enable the fastener to cause the insulation blanket to sealingly engage the insulation frame. In some examples, the first leg and the second leg enable the fastener to receive and couple to a portion of the vehicle compartment frame having an L-shaped cross-section.

In some examples, a plurality of fasteners (e.g., the first fastener, a second fastener, a third fastener, etc.) is disposed in the insulation layer. For example, the first fastener and the second fastener extend along the first side of the insulation blanket (e.g., in the cap strip) and are spaced apart from each other. The second fastener is to receive a portion (e.g., the first portion) of the compartment frame via another channel (e.g., a second channel) formed by the outer layer and the insulation layer of the insulation blanket. Additionally or alternatively, the insulation blanket may include a flexible cover film extending and/or protruding from a second side of the insulation blanket (e.g., opposite the cap strip). The cover film is to engage a second portion of the compartment frame that is spaced apart from the first portion and is to be coupled to the second portion via a second insulation blanket (e.g., via a fastener of the second insulation blanket).

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110 (e.g., a cargo compartment, a passenger compartment, a flight deck, etc.) is disposed within the fuselage 104 of the illustrated example.

Figure 2A:
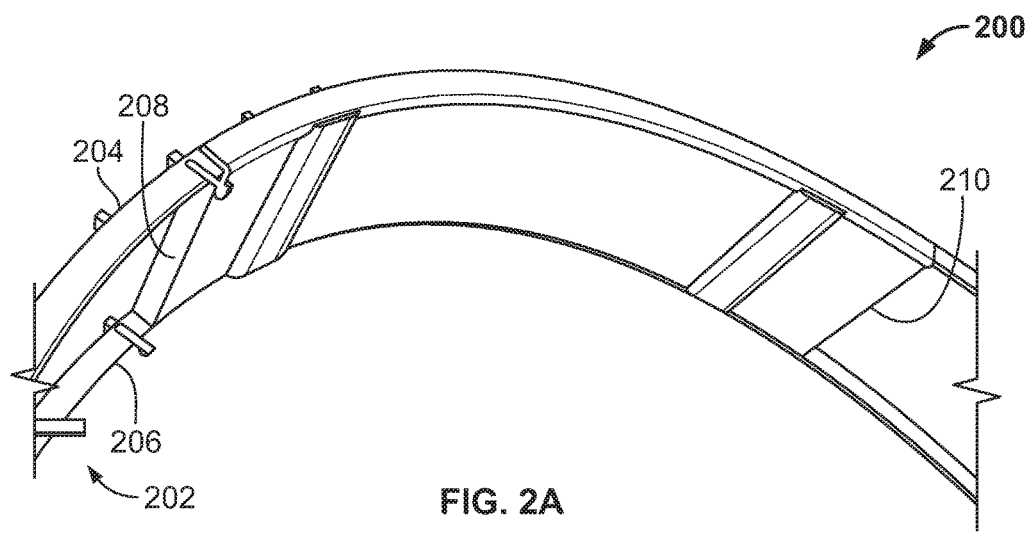
FIGS. 2A and 2B illustrate an example insulation blanket coupled to a frame in accordance with the teachings herein.
Figure 2B:
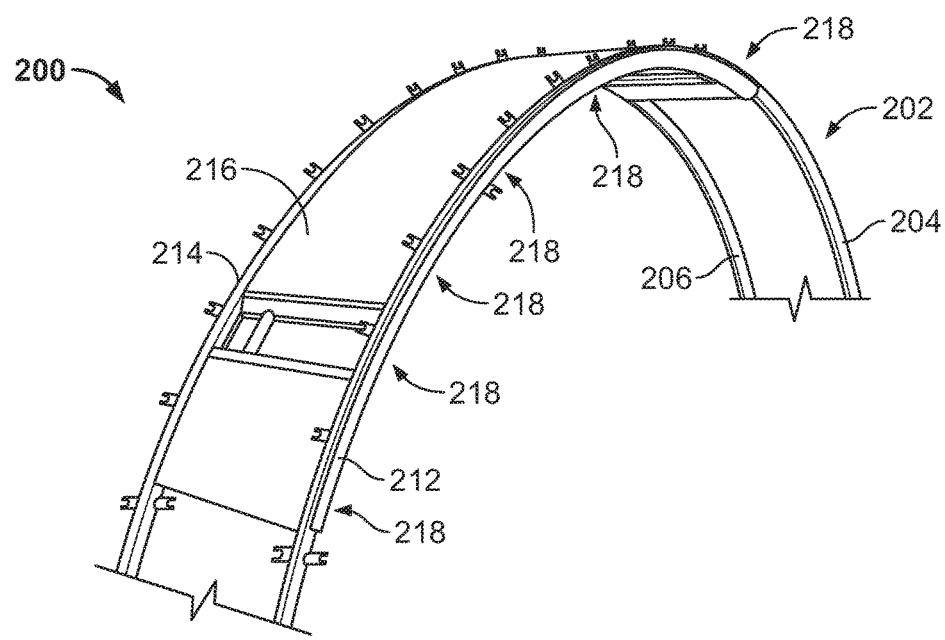

FIGS. 2A and 2B illustrate an example insulation blanket 200 coupled to a frame 202 as disclosed in the teachings herein. For example, the frame 202 is disposed in the fuselage 104 (FIG. 1) of the aircraft 100 (FIG. 1) to define the compartment 110 (FIG. 1) of the aircraft 100. In the illustrated example, the frame 202 includes a first portion 204 (e.g., a first rib) and a second portion 206 (e.g., a second rib) spaced apart from and parallel to the first portion 204. The frame 202 is composed of, for example, aluminum and/or any other material that provides structural support for the compartment 100. As illustrated in FIGS. 2A and 2B, the first and second portions 204, 206 of the frame 202 are curved to extend along an arcuate shape of the fuselage 104. For example, to define the compartment 110 of the aircraft 100, each of the portions 204, 206 of the frame 202 extends from a first side of the fuselage 104, along a crown (e.g., a roof, an upper portion, etc.), to a second side opposite the first side in a direction perpendicular a longitudinal axis of the fuselage 104. In other examples, the frame 202 defines a compartment of a non-aircraft vehicle (e.g., a train, a bus, a tractor-trailer, etc.) and/or any other compartment or room that is to be insulated.

The frame 202 is lined with insulation (e.g., the insulation blanket 200) to protect the compartment 110 from undesirable environmental conditions (e.g., temperatures, pressures, condensation, noise levels, etc.). For example, the example blanket 200 is coupled to the first and second portions 204, 206 of the frame 202 to cover and, thus, insulate a portion of the frame 202. Other insulation blankets substantially similar and/or identical to the insulation blanket 200 are coupled to other portions of the frame 202 to cover and, thus, insulate the other portions of the frame 202.

That is, a plurality of blankets is positioned end-to-end and side-to-side to cover the frame 202 to insulate the compartment 110. For example, an insulation blanket (e.g., a second insulation blanket) may be coupled to the frame 202 adjacent a first end 208 of the insulation blanket 200 and another insulation blanket (e.g., a third insulation blanket) may be coupled to the frame 202 adjacent a second end 210 of the insulation blanket 200 opposite the first end 208 in an end-to-end manner to cover the frame 202 in a circumferential direction. The insulation blankets positioned end-to-end relative to each other overlap and couple to each other (e.g., via hook-and-loop fasteners) to prevent fluid passageways from forming between the insulation blankets.

Further, as disclosed in greater detail below with respect to FIGS. 7 and 8, insulation blankets may be coupled to the frame 202 in a side-by-side manner (e.g., the insulation blanket 200 and an insulation blanket 700 of FIGS. 7 and 8) to cover the frame 202 in a longitudinal direction. The side-by-side insulation blankets 200, 700 overlap to prevent fluid passageways from forming between the insulation blankets 200, 700. Thus, the insulation blankets (e.g., the insulation blanket 200, the insulation blanket 700, etc.) line the frame 202 of the aircraft compartment 110 to maintain safe, comfortable and/or otherwise desirable environmental conditions during flight of the aircraft 100.

As illustrated in FIGS. 2A and 2B, the insulation blanket 200 includes a first side 212, a second side 214 opposite the first side 212, and a bay blanket 216 extending between the first side 212 and the second side 214. For example, the bay blanket 216 includes insulating material (e.g., an insulation layer 302 of FIG. 3) to provide insulation to the frame 202 of the aircraft 100. The first side 212 couples to the first portion 204 of the frame 202, and the second side 214 couples to the second portion 206 of the frame 202. For example, fasteners 218 (e.g., clamps) that sealingly couple the first side 212 of the insulation blanket 200 to the frame 202 are disposed in the insulation blanket 200 along the first side 212. The fasteners 218 extend along the first side 212 of the insulation blanket 200 and are spaced apart from each other. In the illustrated example, each of the example fasteners 218 has a length of about 3 inches and is spaced apart from the adjacent fasteners 218 by about 12 inches. The length of and/or the spacing between the fasteners 218 may be greater or smaller depending upon, for example, the thickness of the frame 202, the length of the frame 202, the length of the insulation blanket 200 and/or any other characteristics of the frame 202 and/or the insulation blanket 200 that may affect the sealed coupling between the insulation blanket 200 and the frame 202. The fasteners 218 are composed of, for example, a metallic or thermoplastic material that enables the fasteners 218 to flexibly receive the frame 202 and to sealingly clamp the insulation blanket 200 to the frame 202. In examples in which the fasteners 218 are composed of a thermoplastic, the material of the fasteners 218 reduces a weight of the insulation blanket 200 to reduce a weight of the corresponding aircraft 100.

FIG. 3 is a cross-section of the insulation blanket 200 that depicts one of the fasteners 218, the insulation layer 302, and an outer layer 304 of the insulation blanket 200. As illustrated in FIG. 3, the insulation layer 302 is disposed in the outer layer 304, and the fastener 218 is disposed in the insulation layer 302. The insulation layer 302 is composed of insulating material, such as a fiberglass composite, that provides thermal and noise insulation to the compartment 110 of the aircraft 100 (FIG. 1). The outer layer 304 is composed of a fire-resistant material, such as a composite of phenolic resin reinforced with woven fiberglass to prevent fire from contacting, igniting and/or otherwise spreading to the insulation layer 302 and/or other areas of the aircraft 100 outside of the compartment 110.

As illustrated in FIG. 3, the insulation blanket 200 includes the bay blanket 216, a cap strip 306 and a cover film 308. The bay blanket 216 is formed by the outer layer 304 and the insulation layer 302 disposed in the outer layer 304 and is positioned between the cap strip 306 and the cover film 308. The bay blanket 216 has a thickness 310 defined substantially by the insulation layer 302 to provide insulation to the compartment 110 of the aircraft 100.

In the illustrated example, the cap strip 306 is coupled to, extends from and/or protrudes from the bay blanket 216 along the first side 212 of the insulation blanket 200. The cap strip 306 is formed by the outer layer 304 and the insulation layer 302 and includes the fastener 218 disposed in the insulation layer 302. For example, the fastener 218 is fixedly coupled to a portion of the insulation blanket 200 (e.g., the insulation layer 302, the outer layer 304) in the cap strip 306 of the insulation blanket 200. As disclosed in further detail below, the fastener 218 and the flexible materials of the outer layer 304 and the insulation layer 302 enable the cap strip 306 to sealingly couple to a portion (e.g., the first portion 204 of FIGS. 2A and 2B) of the frame 202 (FIGS. 2A and 2B) to couple the insulation blanket 200 to the frame 202. In the illustrated example, the cap strip 306 has a thickness 312 less than the thickness of the bay blanket 310 to enable the cap strip 306 to flexibly engage and sealingly couple to the frame 202.

Further, the cover film 308 is coupled to, extends from and/or protrudes from the bay blanket 216 along the second side 214 of the insulation blanket 200 opposite the cap strip 306. The cover film 308 is composed of, for example, a flexible material that enables the cover film 308 to partially wrap around and engage a portion (e.g., the second portion 206 of FIGS. 2A and 2B) of the frame 202 to couple the insulation blanket 200 to the frame 202. As illustrated in FIG. 3, the cover film 308 has a thickness 314 that is significantly less than the thickness 310 of the bay blanket 216 to enable the cap strip 308 to flexibly engage and sealingly couple to the frame 202.

Figure 5:
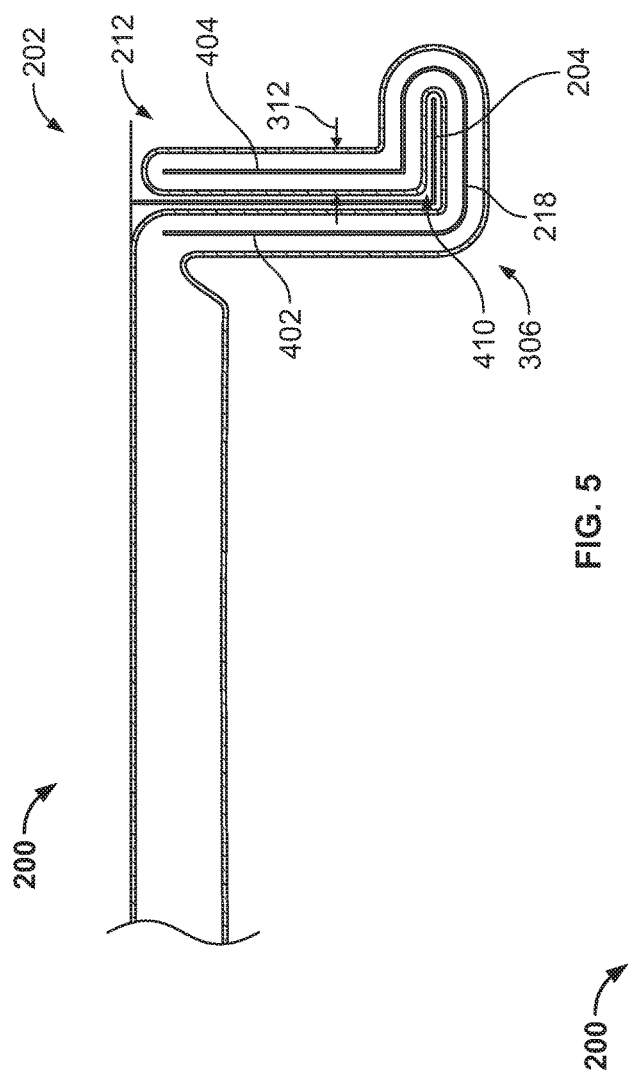
FIG. 5 is a partial cross-sectional view of the first side of the insulation blanket of FIGS. 2A and 2B coupled to a first portion of the frame of FIGS. 2A and 2B.

FIGS. 4 and 5 are partial cross-sections of the first side 212 of the insulation blanket 200. More specifically, FIG. 4 depicts the first side 212 of the insulation blanket 200 uncoupled from the frame 202 (FIGS. 2A and 2B), and FIG. 5 depicts the first side 212 coupled to the frame 202.

In the illustrated example of FIG. 4, the fastener 218 of the cap strip 306 has a U-shaped cross-section prior to coupling to a portion (e.g., the first portion 204 of FIGS. 2A and 2B) of the frame 202. The fastener 218 is a unitary structure that includes a first leg 402, a second leg 404 opposite the first leg 402, and a middle portion 406 connecting the first leg 402 and the second leg 404. In other examples, because the fastener 218 is composed of flexible material, the fastener 218 may have any other cross-sectional shape (e.g., a V-shaped cross-section, a linear cross-section, etc.) that enables the fastener 218 flexibly engage (e.g., partially wrap around) and/or couple to the portion 204 of the frame 202. As illustrated in FIG. 4, the insulation layer 302 and the outer layer 304 of the cap strip 306 are positioned along an inner surface 408 of the fastener 218 (e.g., along the inner surface 408 of the first leg 402, the second leg 404, and the middle portion 406) to define or form a channel 410. For example, the insulation layer 302 and the outer layer 304 are composed of flexible materials that enable the fastener 218 to receive and sealingly couple to the portion 204 of the frame 202 to couple the first side 212 of the insulation blanket 200 to the frame 202. In some examples, the outer layer 304 is composed of a semi-rigid material that further increases the seal between the insulation blanket 200 and the frame 202 when the outer layer 304 engages the frame 202.

FIG. 5 illustrates the first side 212 of the insulation blanket 200 coupled to the frame 202. As illustrated in FIG. 5, the channel 410 of the fastener 218 receives and engages the first portion 204 of the frame 202. For example, the first leg 402 and the second leg 404 flex away from each other to temporarily expand the channel 410 to enable the fastener 218 to receive the first portion 204 of the frame 202. In the illustrated example, the opposing legs 402, 404 are flexible to enable the fastener 218 to receive (and subsequently sealingly couple to) the first portion 204 of the frame 202 having an L-shaped cross-section. Additionally or alternatively, the flexibility of the legs 402, 404 enables the fastener 218 to receive other cross-sectional shapes of the frame 202, such as T-shaped cross-sections, I-shaped cross-sections, etc. Upon the channel 410 of the fastener 218 receiving the first portion 204 of the frame 202, the first leg 402 and the opposing second leg 404 of the fastener 218 flex toward each other to clamp and, thus, sealingly couple the insulation blanket 200 to the frame 202. The fastener 218 is composed of a material (e.g., a metallic material, a thermoplastic material) that provides flexibility to enable the fastener 218 to receive frame 202 and provides strength to enable the fastener 218 to securely clamp the insulation blanket 200 to the frame 202. For example, the material of the fastener 218 is elastically deformable material to enable the fastener 218 to receive and conform to the shape of the frame 202 to which the fastener 218 couples. Additionally or alternatively, the material of the fastener 218 is springably flexible to enable the legs 402, 404 of the fastener 218 to flex outward to receive the frame 202 and subsequently spring back to their contracted form to securely and sealingly couple the insulation blanket 200 to the frame 202.

As illustrated in FIG. 5, a fraction of the thickness 312 of the cap strip 306 (i.e., not the entire thickness 312 of the cap strip 306) is positioned between each of the fasteners 218 of the example insulation blanket 200 and the frame 202. As a result, the fasteners 218 are able to apply an increased clamping pressure to the insulation blanket 200. Thus, a sealing engagement between the insulation blanket 200 and the frame 202 is increased to improve insulation (e.g., acoustic insulation, thermal insulation, air pressure insulation, etc.) provided to the compartment 110 by the insulation blanket 200. Further, by containing the fasteners 218 in the insulation layer 302 of the insulation blanket 200, the fasteners 208 are provided thermal and/or moisture insulation by the insulation layer 302 to prevent the fasteners 218 from acting as cold sinks that generate and accumulate moisture. As a result, the example insulation blanket 200 prevents and/or reduces an amount of condensation from forming on the fasteners 218 and, thus, in the compartment 110 of the aircraft 100 (FIG. 1). Additionally or alternatively, by containing the fasteners 218 in the insulation layer 302, the insulation blanket 200 is couplable to the frame 202 without requiring additional external fasteners. As a result of the reduced number of components needed to install the insulation blanket 200, the installation time of and/or the possibility of foreign object debris (e.g., misplaced external fasteners) in the aircraft 100 is significantly reduced.

Figure 6:
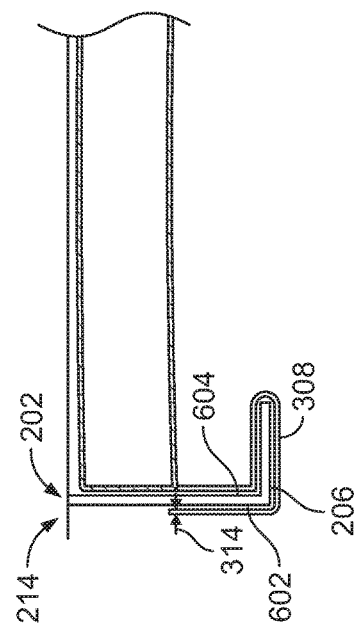
FIG. 6 is a partial cross-sectional view of a second side of the insulation blanket coupled to a second portion of the frame of FIGS. 2A and 2B.

FIG. 6 is a partial cross-section of the second side 214 of the example insulation blanket 200 coupled to the frame 202. As illustrated in FIG. 6, the cover film 308 engages the second portion 206 of the frame 202 to enable the second side 214 of the insulation blanket 200 to be sealingly coupled to the frame 202. The cover film 308 wraps around the second portion 206 of the frame 202 to engage a first side 602 and an opposing second side 604 of the second portion 206. The cover film 308 is composed of a flexible material (e.g., a non-fiberglass composite) that enables the cover film 308 to conform to differently shaped portions of the frame 202 (e.g., an L-shaped cross-section illustrated in FIG. 6, a T-shaped cross-section, an I-shaped cross-section, etc.). As described in further detail below in connection with FIG. 8, the cover film 308 is securely coupled to the second portion 206 of the frame 202 via fasteners (e.g., fasteners 806 of FIG. 8) of an adjacent insulation blanket (e.g., the insulation blanket 700 of FIGS. 7 and 8) to sealingly couple the second side 214 of the insulation blanket 200 to the frame 202. The thickness 314 of the cover film 308 is selected to enable the fasteners 806 of the other insulation blanket 700 to securely clamp the cover film 308 to the frame 202.

In other examples, the cover film 308 does not extend from the second side 214 of the insulation blanket 200 as illustrated in FIG. 6. Instead, in some such examples, another cap strip (e.g., substantially similar or identical to the cap strip 306 of FIGS. 3-5) extends along the second side 214 that couples to the second portion 206 of the frame 200 via fasteners (e.g., substantially similar or identical to the fasteners 218 of FIGS. 3-5).

Figure 7:
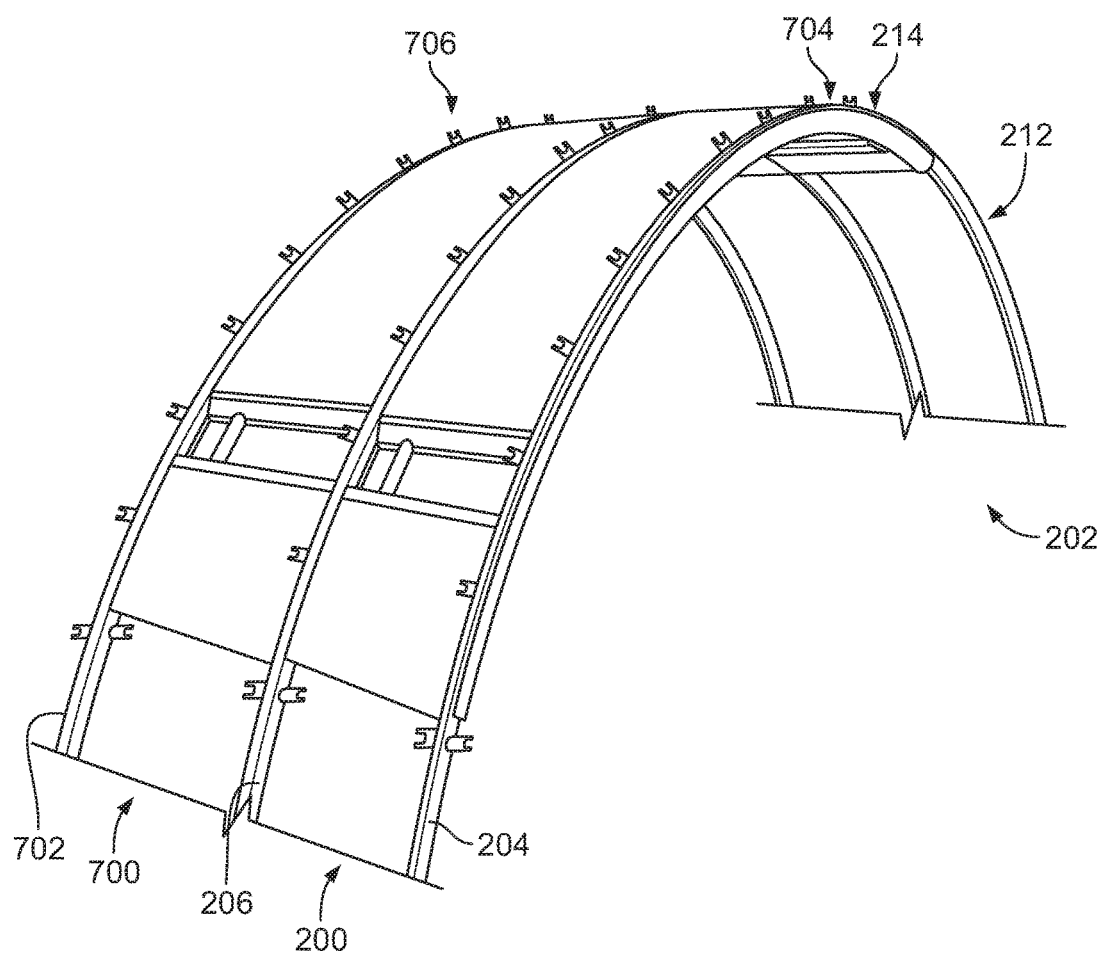
FIG. 7 illustrates the example insulation blanket of FIGS. 2A and 2B and another example insulation blanket coupled to a frame side-by-side in accordance with the teachings herein.
Figure 8:
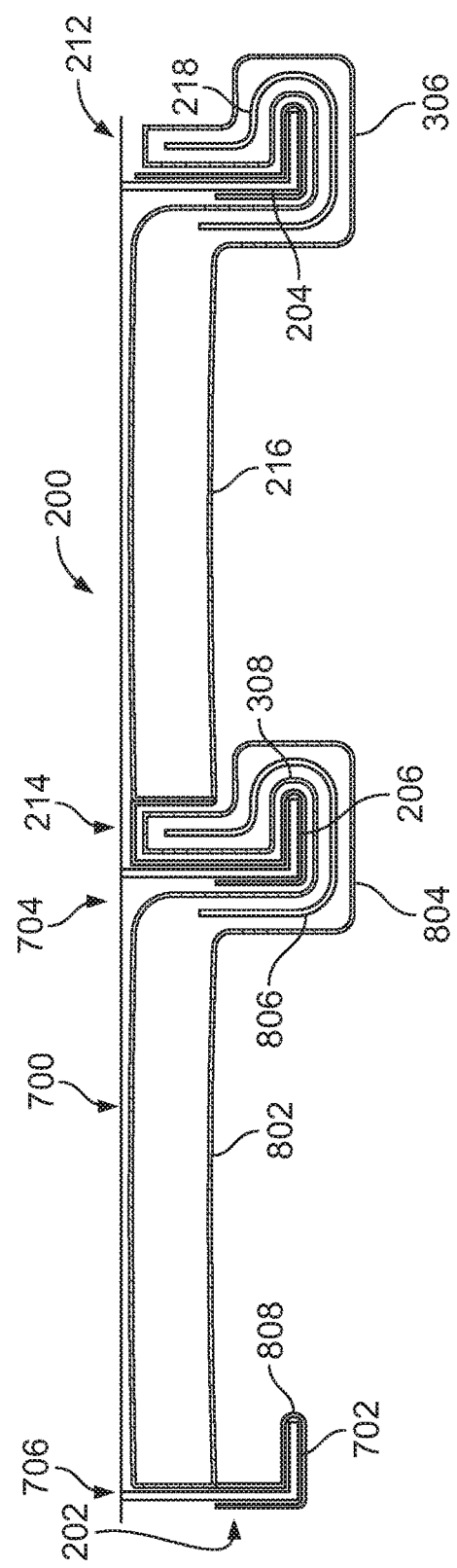
FIG. 8 is a cross-sectional view of the insulation blankets coupled to the frame of FIG. 7.

FIGS. 7 and 8 illustrate the example insulation blanket 200 and the example insulation blanket 700 coupled side-by-side to the frame 202 in accordance with the teachings herein. More specifically, FIG. 7 is a perspective view of the insulation blankets 200, 700 coupled to the frame 202, and FIG. 8 is a cross-sectional view of the insulation blankets 200, 700 coupled to the frame 202.

Components of the example insulation blanket 200 of FIGS. 7 and 8 are substantially similar or identical to those components having the same reference numbers in FIGS. 2A-6. Those components are described above in further detail in connection with FIGS. 2A-6. Further, components of the example blanket 700 of FIGS. 7 and 8 are substantially similar or identical to the components of the example insulation blanket 200. Because the components of the example insulation blanket 200 are described in detail in connection with FIGS. 2A-6, some characteristics of the corresponding components of the example insulation blanket 700 will not be described in further detail.

As illustrated in FIG. 7, the insulation blanket 200 and the insulation blanket 700 are coupled side-by-side to the frame 202. In the illustrated example, the frame 202 includes the first portion 204 (e.g., the first rib), the second portion 206 (e.g., the second rib) spaced apart from and parallel to the first portion 204, and a third portion 702 (e.g., a third rib) spaced apart from and parallel to the first and second portions 204, 206. The first side 212 of the insulation blanket 200 is coupled to the first portion 204, and the second side 214 of the insulation blanket 200 is coupled to the second portion 206. A first side 704 of the insulation blanket 700 is coupled to the second portion 206 of the frame 202, and a second side 706 of the insulation blanket 700 opposite the first side 704 is coupled to the third portion 702.

FIG. 8 further illustrates the insulation blankets 200, 700 coupled to the frame 202 in a side-by-side manner. As illustrated in FIG. 8, the insulation blanket 200 includes the bay blanket 216, the cap strip 306 extending from and/or coupled to the bay blanket 216 along the first side 212 of the insulation blanket 200, and the cover film 308 extending from and/or coupled to the bay blanket 216 along the opposing second side 214. The insulation blanket 700 includes a bay blanket 802, a cap strip 804 that includes the fasteners 806 and extends from and/or is coupled to the bay blanket 802 along the first side 704 of the insulation blanket 700, and a cover film 808 extending from and/or coupled to the bay blanket 802 along the opposing second side 706.

In the illustrated example, the first side 212 of the insulation blanket 200 sealingly couples to the first portion 204 of the frame 202 via the fasteners 218 of the cap strip 306. To sealingly couple the second side 214 of the insulation blanket 200 to the second portion 206 of the frame 202, the cover film 308 of the insulation blanket 200 engages the second portion 206, the fasteners 806 of the cap strip 804 of the insulation blanket 700 extend over the cover film 308, and the fasteners 806 subsequently securely clamp the cover film 308 to the second portion 206. Thus, the cover film 308 of the insulation blanket 200 and the cap strip 804 of the insulation blanket 700 enable the insulation blanket 200 and the insulation blanket 700 to couple to the same portion of the frame 202 (e.g., the second portion 206 of the frame 202) in a side-by-side manner. Further, because the cap strip 804 of the insulation blanket 700 overlaps the cover film 308 when coupled to the second portion 206, the insulation blankets 200, 700 sealingly couple to the second portion 206 to prevent and/or substantially reduce the risk of a gap and/or a fluid passageway forming between the adjacent insulation blankets 200, 700. As a result, the insulation blankets 200, 700 to increase an amount of insulation (e.g., acoustic insulation, thermal insulation, moisture insulation, air pressure insulation, etc.) provided to the compartment 110 of the aircraft 100 (FIG. 1).

Further, as illustrated in FIG. 8, the cap strip 804 of the insulation blanket 700 engages the third portion 702 of the frame 202 to enable fasteners of another adjacent blanket (e.g., a third insulation blanket identical and/or substantially similar to the insulation blankets 200, 700) to sealingly couple the second side 706 of the insulation blanket 700 to the third portion 702 of the frame 202. Thus, each insulation blanket (e.g., the insulation blanket 200, the insulation blanket 700, the third insulation blanket, etc.) overlaps with adjacent insulation blankets to sealingly couple to the frame 202 via insulated fasteners (e.g., the fasteners 218, the fasteners 806, fasteners of the third insulation blanket, etc.) to increase an amount of insulation provided to the compartment 110 of the aircraft 100.

Figure 9:
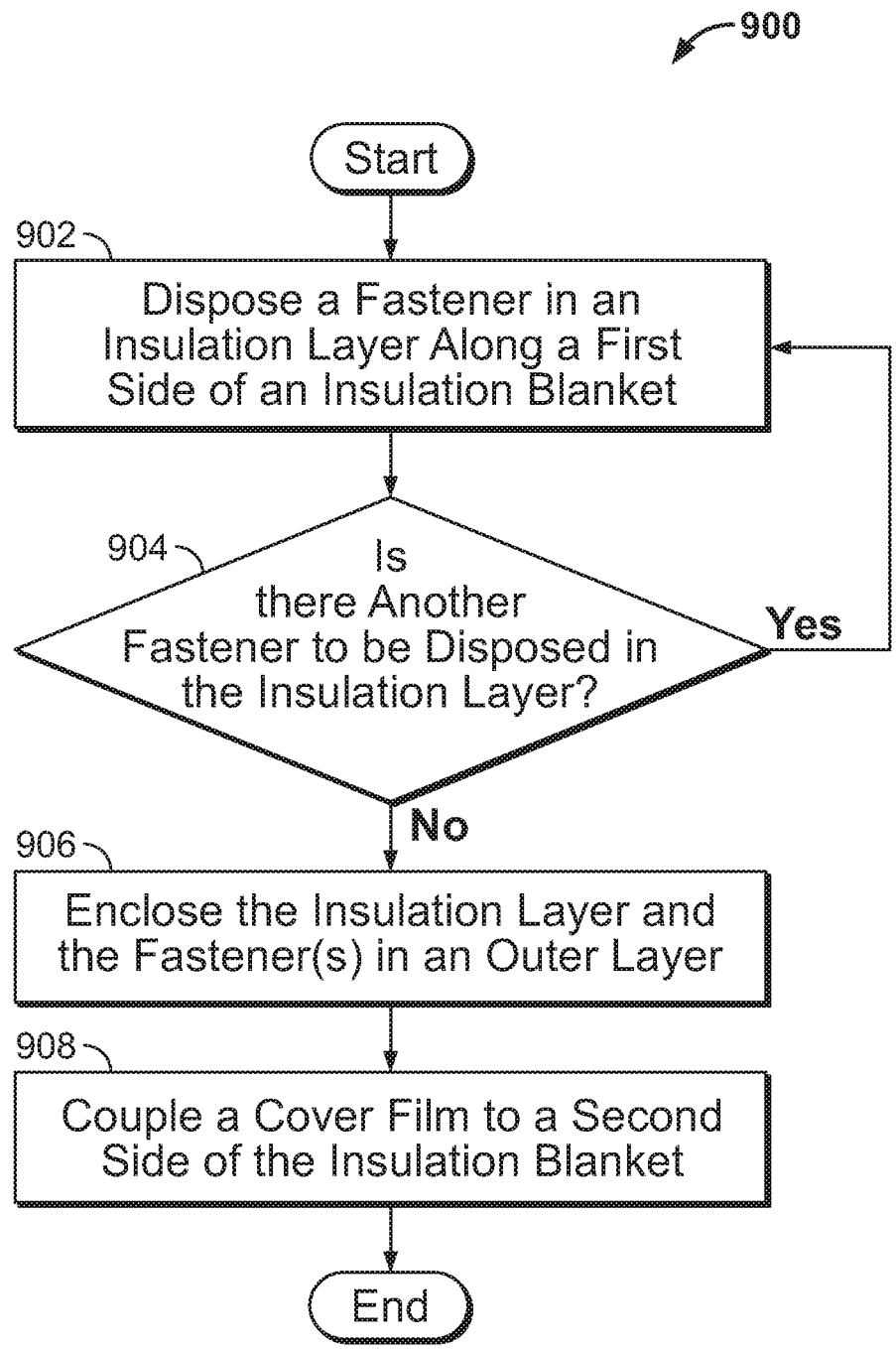
FIG. 9 is a flowchart representative of an example method to form the example insulation blanket of FIGS. 2A-8 and/or the example insulation blanket of FIGS. 7-8 in accordance with the teachings herein.

FIG. 9 is a flowchart representative of an example method 900 to assemble an insulation blanket in accordance with the teachings herein. Although the example method 900 is described with reference to the flowchart illustrated in FIG. 9, many other methods of assembling the insulation blanket may alternatively be used. For example, the order of execution of the blocks may be changed, and/or some of the blocks described changed, eliminated, and/or combined.

The example method 900 for assembling an insulation blanket is discussed in connection with the example insulation blanket 200 of FIGS. 2A-8 and/or the example insulation blanket 700 of FIGS. 7-8. Further, because the example method 900 may refer to the example insulation blanket 200 of FIGS. 2A-8 and/or the example insulation blanket 700 of FIGS. 7-8, components identified in FIGS. 2A-8 having functions substantially similar or identical to the functions of components described below will not be described in detail again. Instead, the same reference numbers will be used for like structures.

The example method 900 disclosed herein starts at block 902 by disposing a fastener (e.g., one of the fasteners 218 of FIGS. 3-5 and 8, one of the fasteners 806 of FIG. 8) in an insulation layer (e.g., the insulation layer 302 of FIGS. 3-4) along a first side (e.g., the first side 212 of FIGS. 2A-5 and 7-8, the first side 704 of FIGS. 7-8) of an insulation blanket (e.g., the insulation blanket 200 of FIGS. 2A-8, the insulation blanket 700 of FIGS. 7-8). For example, the fastener is disposed in a cap strip (e.g., the cap strip 306 of FIGS. 3-5 and 8, the cap strip 804 of FIG. 8) that extends along the first side of the insulation blanket. In some examples, to dispose the fastener in the insulation layer, the fastener is positioned in an opening formed in the insulation layer and/or a portion of the insulation layer is wrapped around the fastener. Further, in some examples, the fastener is disposed in the insulation layer such that the fastener is securely coupled to the insulation blanket. At block 904, the example method 900 determines whether there is another fastener to be disposed in the insulation layer. If there is another fastener, blocks 902, 904 are repeated until no other fasteners are identified.

At block 906, the insulation layer and the fastener(s) disposed in the insulation layer are enclosed in an outer layer (e.g., the outer layer 304 of FIGS. 3-4). In other words, at block 906, the insulation layer and the fastener(s) are disposed in the outer layer. At block 908, a cover film (e.g., the cover film 308 of FIGS. 3, 6, and 8, the cover film 808 of FIG. 8) is coupled to a second side (e.g., the second side 214 of FIGS. 2A-3 and 6-8, the second side 706 of FIGS. 7-8) of the insulation blanket opposite the first side. For example, the cover film is coupled to the insulation blanket such that the cover film protrudes from and/or extends along the second side.

Figure 10:
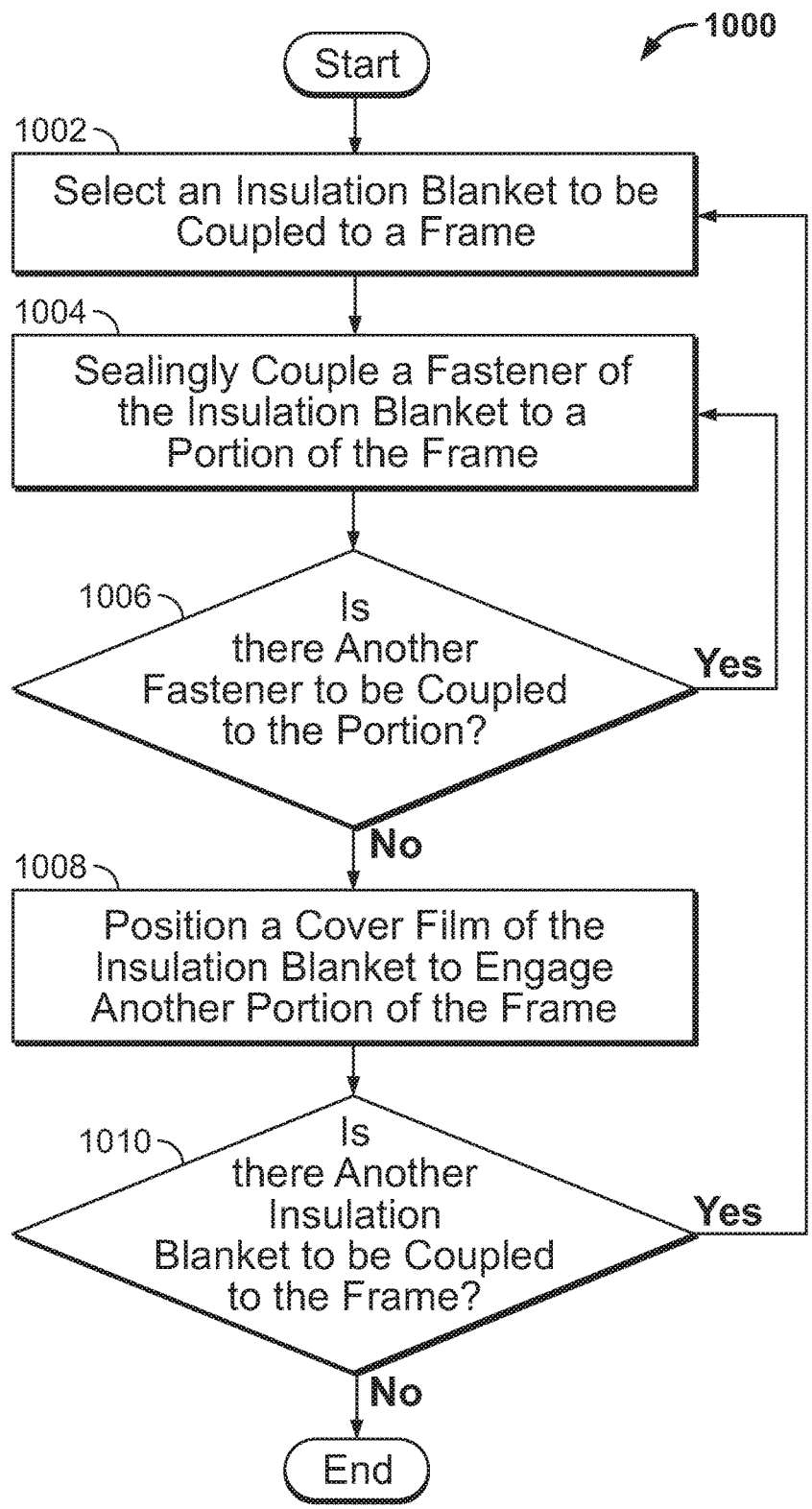
FIG. 10 is a flowchart representative of an example method to install the example insulation blanket of FIGS. 2A-8 and/or the example insulation blanket of FIGS. 7-8 in the example aircraft of FIG. 1 in accordance with the teachings herein.

Further, FIG. 10 is a flowchart representative of an example method 1000 to couple an insulation blanket to a frame in accordance with the teachings herein. Although the example method 1000 is described with reference to the flowchart illustrated in FIG. 10, many other methods of coupling the insulation blanket to the frame may alternatively be used. For example, the order of execution of the blocks may be changed, and/or some of the blocks described changed, eliminated, and/or combined.

The example method 1000 for coupling an insulation blanket to a frame is discussed in connection with the example insulation blanket 200 of FIGS. 2A-8, the example insulation blanket 700 of FIGS. 7-8, and/or the example frame 202 of FIGS. 2A-8. Further, because the example method 1000 may refer to the example insulation blanket 200 of FIGS. 2A-8, the example insulation blanket 700 of FIGS. 7-8, and/or the example frame 202 of FIGS. 2A-8, components identified in FIGS. 2A-8 having functions substantially similar or identical to the functions of components described below will not be described in detail again. Instead, the same reference numbers will be used for like structures.

The example method 1000 disclosed herein starts at block 1002 by selecting an insulation blanket (e.g., the insulation blanket 200 of FIGS. 2A-8, the insulation blanket 700 of FIGS. 7-8) to be coupled to a frame (e.g., the frame 202 of FIGS. 2A-2B and 5-8). At block 1004, a fastener (e.g., one of the fasteners 218 of FIGS. 3-5 and 8, one of the fasteners 806 of FIG. 8) of the selected insulation blanket is sealingly coupled to a portion (e.g., the first portion 204 of FIGS. 2A-2B, 5 and 7-8, the second portion 206 of FIGS. 2A-2B and 6-8) of the frame. For example, to sealingly couple the fastener to the portion of the frame, opposing legs (e.g., the first and second legs 402, 404 of FIGS. 4-5) are flexed away from each other to enable the fastener to receive the portion of the frame and, upon the fastener receiving the frame, the legs are flexed toward each to clamp the insulation blanket to the frame. At block 1006, the example method determines if there is another fastener of the selected insulation blanket that is to be coupled to the portion of the frame. If there is another fastener, blocks 1004, 1006 are repeated until no other fasteners of the selected insulation blanket are identified.

At block 1008, the example method 1000 includes positioning a cover film (e.g., the cover film 308 of FIGS. 3, 6 and 8, the cover film 808 of FIG. 8) of the selected insulation blanket to engage another portion (e.g., the second portion 206 of FIGS. 2A-2B and 6-8, the third portion 702 of FIGS. 7-8) of the frame. The cover film is positioned to engage the portion to enable fasteners (e.g., the fasteners 218 of FIGS. 3-5 and 8, the fasteners 806 of FIG. 8) of another insulation blanket (e.g., the other of the insulation blankets 200, 700) to couple the cover film to that portion of the frame. At block 1010, the example method determines whether there is another insulation blanket to be coupled to the frame. If there is another insulation blanket, blocks 1002, 1004, 1006, 1008, 1010 are repeated until no other insulation blankets are identified.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
an insulation blanket including:
an outer layer;
an insulation layer disposed in the outer layer; and
a first fastener enclosed in the insulation layer, the outer layer and the insulation layer forming a first channel, the first fastener receiving, via the first channel, a first portion of a vehicle compartment frame to sealingly couple the insulation layer and the outer layer of the insulation blanket to the vehicle compartment frame when the insulating blanket is coupled to the vehicle compartment frame.

2. The apparatus of claim 1, wherein the vehicle compartment frame is an aircraft compartment frame disposed in a nacelle of an aircraft, the insulation blanket to couple to the aircraft compartment frame to insulate an aircraft compartment to deter fluid from flowing between the aircraft compartment and an exterior of the aircraft.

3. The apparatus of claim 1, wherein the first fastener is disposed in the insulation blanket to prevent the first fastener from separating from the insulation blanket.

4. The apparatus of claim 1, wherein the insulation blanket further includes:
a bay blanket formed by the outer layer and the insulation layer; and
a cap strip extending along and coupled to a first side of the bay blanket, the cap strip formed by the outer layer and the insulation layer and including the first fastener, the cap strip to sealingly couple the insulation blanket to the first portion of the vehicle compartment frame.

5. The apparatus of claim 4, further including a flexible cover film extending from a second side of the bay blanket opposite the cap strip, the cover film to engage a second portion of the vehicle compartment frame spaced apart from the first portion of the vehicle compartment frame, the cover film to be coupled to the second portion of the vehicle compartment frame via a second insulation blanket.

6. The apparatus of claim 1, further including a second fastener disposed in the insulation layer, the second fastener and the first fastener extending along a first side of the insulation blanket, the second fastener spaced apart from the first fastener, the second fastener to receive, via a second channel formed by the outer layer and the insulation layer, the first portion of the vehicle compartment frame.

7. The apparatus of claim 1, wherein the first fastener is composed of a thermoplastic material and the outer layer is composed of a fire-resistant material that provides flame-penetration resistance to the first fastener and the insulation layer.

8. The apparatus of claim 1, wherein the first fastener is disposed in the insulation blanket to increase a sealing engagement between the insulation blanket and the vehicle compartment frame to at least one of increase acoustic insulation, increase thermal insulation, and decrease moisture accumulation.

9. The apparatus of claim 1, wherein the outer layer and the insulation layer are composed of flexible materials to enable a first portion of the outer layer and an adjacent second portion of the insulation layer to be positioned along an inner surface of the first fastener to enable the first fastener to couple the insulation blanket to the vehicle compartment frame.

10. The apparatus of claim 1, wherein the outer layer is composed of a semi-rigid material, a portion of outer layer is positioned along an inner surface of the first fastener to enable the first fastener to couple the insulation blanket to the vehicle compartment frame, the semi-rigid material enables the outer layer of the insulation blanket to form a seal with a surface of the vehicle compartment frame.

11. An apparatus comprising:
a unitary fastener enclosed in a flexible insulation blanket to sealingly couple the insulation blanket to an aircraft compartment frame, the fastener including:
a first leg;
a second leg opposite the first leg; and a middle portion extending between the first leg and the second leg, wherein the first leg, the second leg, and the middle portion of the fastener define a channel receiving the aircraft compartment frame, the first leg and the second leg to engage the aircraft compartment frame to sealingly couple the insulation blanket to the aircraft compartment frame when the apparatus is coupled to the aircraft compartment frame.

12. The apparatus of claim 11, wherein the fastener is fixedly coupled to the insulation blanket.

13. The apparatus of claim 11, wherein the fastener is contained in a cap strip extending along and protruding from a side of the insulation blanket.

14. The apparatus of claim 11, wherein the first leg and the second leg clamp a portion of the insulation blanket to the aircraft compartment frame to form a seal between the insulation blanket and the aircraft compartment frame.

15. The apparatus of claim 11, wherein the first leg and the second leg flex away from each other to enable the fastener to receive the aircraft compartment frame and, upon the fastener receiving the aircraft compartment frame, the first leg and the second leg are to flex toward each other to enable the fastener to clamp the insulation blanket to the aircraft compartment frame.

16. A method comprising:
  disposing fasteners in an insulation layer of an insulation blanket along a first side of the insulation blanket, the fasteners spaced apart from each other along the first side;
  enclosing the fasteners and the insulation layer in an outer layer to form the insulation blanket; and
  forming the insulation layer and the outer layer to a channel defined by the fasteners extending along the first side of the insulation blanket, the channel receiving a first portion of a vehicle compartment frame to sealingly couple the insulation blanket to the vehicle compartment frame when the insulating blanket is coupled to the vehicle compartment frame.

17. The method of claim 16, further including fixedly coupling the fasteners to the insulation layer along the first side of the insulation blanket.

18. The method of claim 16, wherein disposing the fasteners in the insulation layer along the first side of the insulation blanket includes disposing the fasteners in a cap strip that extends along the first side of the insulation blanket.

19. The method of claim 16, further including coupling a cap strip to a second side of the insulation blanket opposite the first side, the cap strip is to engage a second portion of the vehicle compartment frame to enable the second side of the insulation blanket to couple to the second portion of the vehicle compartment frame.

20. The method of claim 16, further including sealingly coupling the first side of the insulation blanket to the first portion of the vehicle compartment frame via the fasteners by receiving the first portion of the vehicle compartment frame in the channel defined by the fasteners.

* * * * *